(12) United States Patent
Loccisano

(10) Patent No.: US 12,110,859 B1
(45) Date of Patent: Oct. 8, 2024

(54) FLUID TURBINE WITH AERO-ELASTIC DAMPING

(71) Applicant: Vincent Loccisano, Wellesley, MA (US)

(72) Inventor: Vincent Loccisano, Wellesley, MA (US)

( * ) Notice: Subject to any disclaimer, the term of this patent is extended or adjusted under 35 U.S.C. 154(b) by 0 days.

(21) Appl. No.: 18/628,118

(22) Filed: Apr. 5, 2024

Related U.S. Application Data

(60) Provisional application No. 63/494,589, filed on Apr. 6, 2023.

(51) Int. Cl.
*F03D 1/04* (2006.01)
(52) U.S. Cl.
CPC .............. *F03D 1/053* (2023.08); *F03D 1/042* (2023.08); *F05B 2240/13* (2013.01); *F05B 2250/33* (2013.01)
(58) Field of Classification Search
CPC .......... F03D 1/053; F03D 1/042; F03D 1/051; F03D 1/0691; F03D 1/101; F03D 1/165; F03D 1/181; F03D 13/112; F03D 13/116; F03D 13/201; F03D 13/2005; F05B 2240/13; F05B 2250/33
See application file for complete search history.

(56) References Cited

U.S. PATENT DOCUMENTS 9,926,906 B2 * 3/2018 Mansberger .............. F03D 9/25

FOREIGN PATENT DOCUMENTS

| DE | 19526718 A1 * | 1/1997 | ............... F03D 1/04 |
| DE | 102007058274 A1 * | 6/2009 | ............... F03D 1/04 |

* cited by examiner

*Primary Examiner* — Courtney D Heinle
*Assistant Examiner* — Danielle M. Christensen

(57) ABSTRACT

An apparatus and method for designing a diffuser-augmented wind turbine with significantly reduced time-averaged loads and significantly reduced dynamic amplification factors. Some embodiments have an annular airfoil in fluid communication with the circumference of a rotor plane, and a vertical surface with a substantially symmetrical aerodynamic form with an articulated portion.

2 Claims, 5 Drawing Sheets

FLUID TURBINE WITH AERO-ELASTIC DAMPING

TECHNICAL FIELD

The present disclosure relates to fluid turbines in general and more specifically to the aerodynamic structures for protecting a fluid turbine from buffeting, vortex-shedding and aero-elastic instability.

BACKGROUND

Diffuser-augmented wind turbines are known to increase the amount of energy that a wind turbine rotor can extract from a fluid stream. In a ducted turbine, the upstream area of a fluid stream is larger than the area at the rotor plane due to the flow contraction at the duct. The fluid stream is contracted at the rotor plane by the duct and expands after leaving the duct. The energy that may be harvested from the fluid is proportional to the upstream area where the fluid stream starts in a non-contracted state. In a conventional diffuser-augmented turbine, the diffuser surrounds the rotor such that it guides incoming fluid prior to its interaction with the rotor, providing the greatest unit-mass flow rate proximal to the rotor plane.

Ringed airfoils such as those of this disclosure have an inlet or leading edge and an exit or trailing edge with the lift or suction side of the airfoils on the side proximal to the rotor. The fluid stream is divided into a low pressure/high-velocity stream on the airfoil's interior, and a high pressure/lower-velocity stream on the airfoil's exterior. The higher pressure/lower velocity stream is the bypass flow.

Using idealized but broadly representative models, the power coefficient based on rotor diameter is increased over an open rotor by the ratio of the velocity at the location of the rotor, divided by the free-stream fluid velocity. This is measured as velocity (U) at the rotor plane (P) at power extraction factor of zero (0), referred to as UP-0.

Wind turbines are often located in areas with relatively predictable wind patterns, varying between approximately 15-25 m/s. However during storm conditions, wind speeds can reach extreme levels capable of damaging wind-turbine structures. Turbines are constructed and reinforced to withstand the effects of high wind speeds. Excessive wind conditions and high-speed gusts can cause significant fatigue loads on the structural components of a wind turbine. Ducted turbines, which have additional structural surface area, are susceptible to added fatigue loads and stress on structural components.

"Bluff-body" flow is flow over a duct surface that separates or stalls. Time-resolved loads are those measured or predicted as a function of time. Time-averaged loads are time-resolved loads that are averaged over a period of time.

The combination of increased surface area and bluff-body flow results in significantly increased time-averaged loads and time-resolved loads. The ratio of the peak time resolved loads to time-averaged loads is defined herein as the dynamic amplification factor. The combination of 1) low or negative aero-damping and 2) coherent vortex-shedding phenomena associated with bluff bodies results in high dynamic-amplification factors.

The effect of loads on turbine structure is referred to as aero-elastic response of a structure. Aero-elastic response can be viewed in terms of three primary mechanisms: buffeting, vortex-shedding and aero-elastic instability. Buffeting is defined as loads due to incoming turbulence loading a structure. Vortex-shedding is the alternate shedding of quasi-coherent vortices that detach periodically from alternate sides of a body, generating an oscillatory load. Vortex-shedding is particularly damaging when shedding frequencies are coincident with the natural frequency of support structures. Aero-elastic instability, also known as flutter, occurs when aerodynamic forces on an object couple with a structure's natural mode of vibration to produce rapid periodic motion. In flutter, motion-dependent, aerodynamic forces reinforce motion of a structure in a manner sufficient to overcome the structural damping of the system.

SUMMARY

The present invention discloses an apparatus and method to design a diffuser augmented wind turbine with significantly reduced time-averaged loads and significantly reduced dynamic amplification factors over the current state of the art. In one embodiment, a neutral aerodynamic form resides upwind from a turbine structure and mitigates the effects of aero-elastic instability (buffeting, vortex-shedding and the like).

The present disclosure relates to a fluid turbine with power-extraction improvements over that of open-rotor turbines. The turbine has a multiple-element airfoil in combination with mass-balanced, pivoting, vertical surfaces that damp aerodynamic loads. Some embodiments have at least one annular airfoil in fluid communication with the circumference of a rotor plane, and at least one vertical surface with a substantially symmetrical aerodynamic form. An iteration of the embodiment includes a substantially symmetrical, mass-balanced, vertical aerodynamic form with at least one articulated portion.

Fluid turbines may be used to extract energy from a variety of fluids, including air and water. The aerodynamic principles of this embodiment generally apply also to hydrodynamic principles of a mixer-ejector water turbine.

For convenience, the present embodiment is described in relation to ducted wind turbine applications and is not intended to be limiting in scope.

DETAILED DESCRIPTION

A ducted turbine provides an improved means of generating power from fluid currents. A primary shroud contains a rotor which extracts power from a primary fluid stream. A mixer-ejector pump ingests flow from the primary fluid stream and secondary flow, and promotes turbulent mixing of the two fluid streams. This enhances the power system by increasing the amount of fluid flow through the system, increasing the velocity at the rotor for more power availability, and reducing back pressure on turbine blades.

"Rotor" refers to any assembly in which one or more blades are attached to a shaft and rotate, allowing for the extraction of power or energy from wind rotating the blades. Any propeller-like rotor or a rotor/stator assembly may be enclosed in the turbine shroud in the present disclosure.

The leading edge of a turbine shroud may be considered the front, and the trailing edge of an ejector shroud may be considered the rear of the fluid turbine. A first component of the fluid turbine, located closer to the front of the turbine, may be considered "upstream" of a second, "downstream" component closer to the rear of the turbine.

A wind turbine has a ringed turbine shroud surrounding a rotor, and an ejector shroud that surrounds the exit of the turbine shroud. Vertical, aerodynamic surfaces mitigate aero-elastic loads on the turbine structures.

Figure 1:
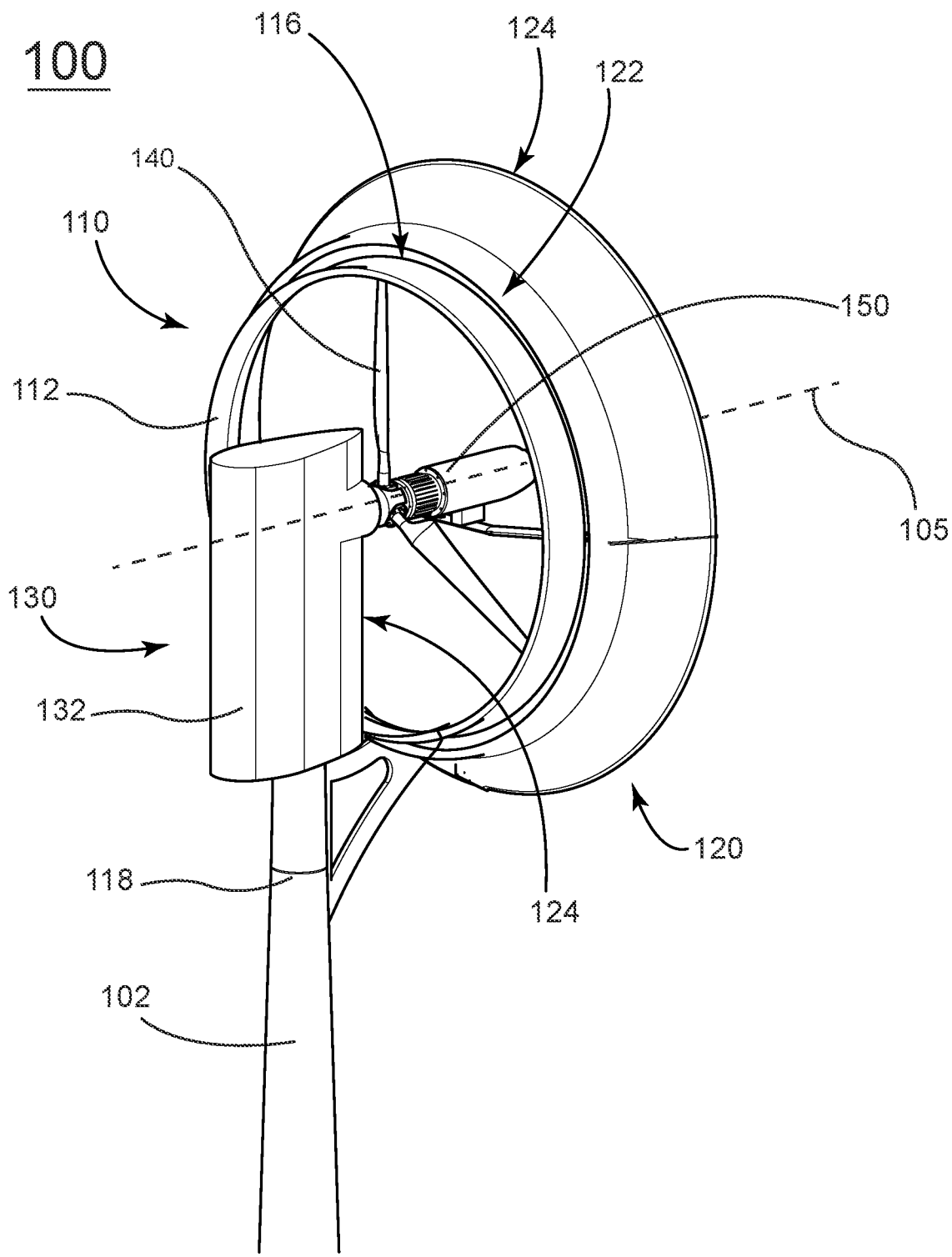
FIG. 1 is a front, right-perspective view of an exemplary embodiment of a shrouded fluid turbine with an aeroelastic damper.
Figure 2:
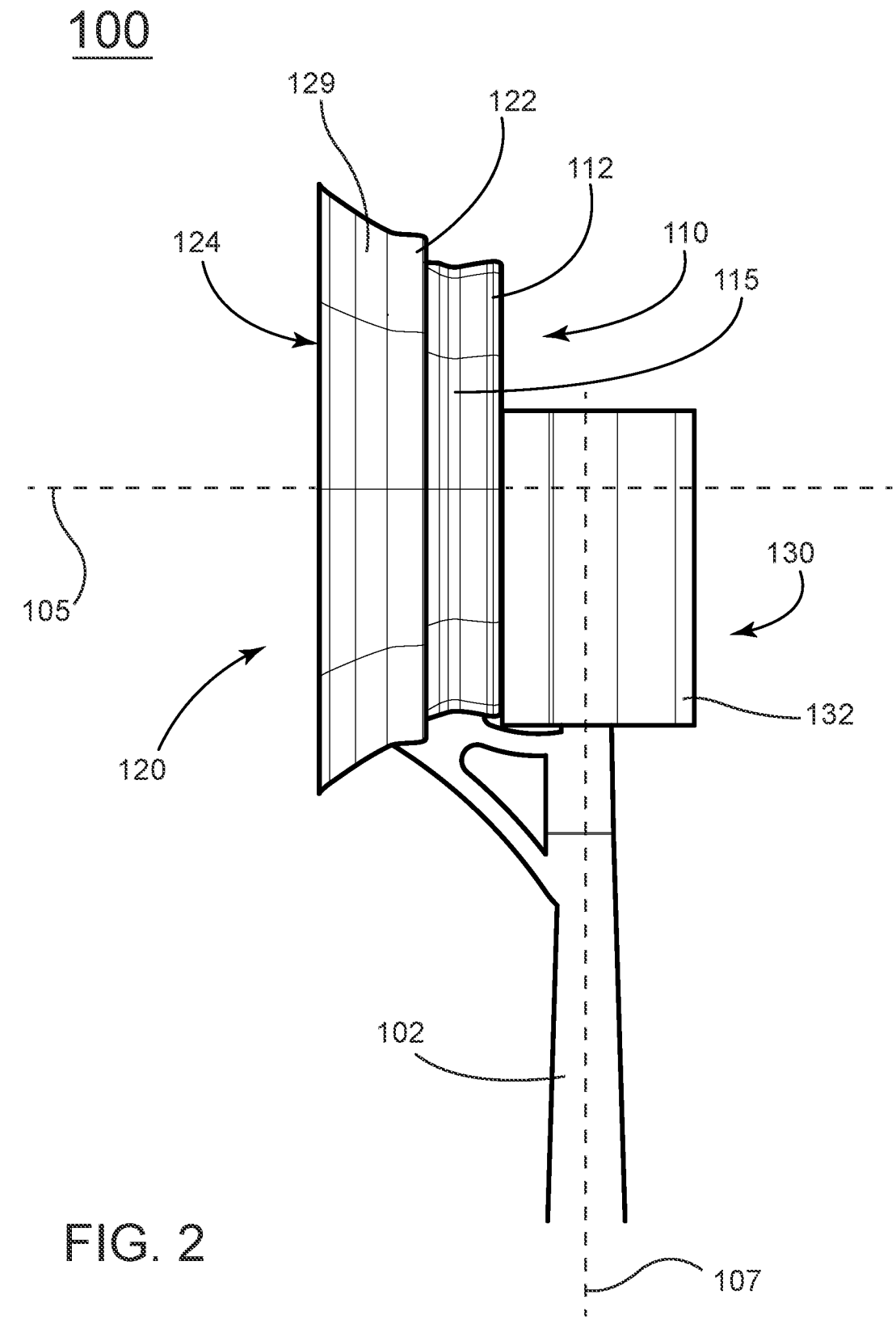
FIG. 2 is a side, orthographic view of the fluid turbine of FIG. 1.
Figure 3:
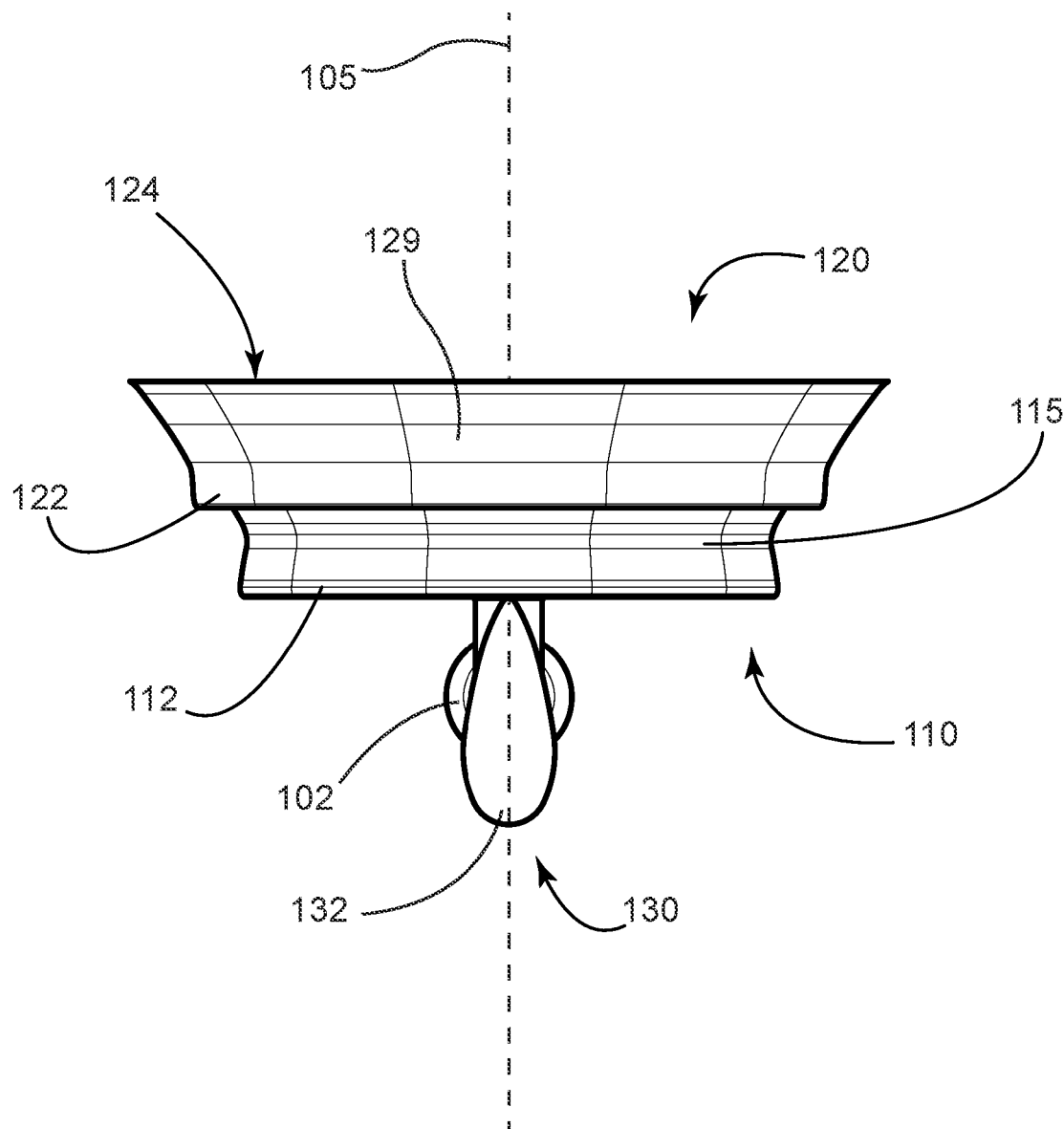
FIG. 3 is a top, orthographic view of the fluid turbine of FIG. 1.

FIG. 1, FIG. 2 and FIG. 3 show a shrouded fluid turbine 100 with rotor blades 140 that are engaged with a nacelle 150 and rotate about a central axis 105. The rotor is joined to a shaft that is coaxial with the hub and with the nacelle 150. The nacelle 150 houses electrical-generation equipment. A primary airfoil 110 (referred to as a turbine shroud) is in fluid communication with the rotor 140 and is coaxial with the central axis 105. The annular airfoil 110 comprises a leading-edge, inlet portion 112, and an outlet, trailing-edge portion 116. A secondary annular airfoil 120 (referred to as an ejector shroud) has a leading edge 122 and a trailing edge 124. The leading edge 122 of the ejector shroud 120 is in fluid communication with the trailing edge 116 of the primary annular airfoil 110. The annular airfoils 110, 120 are coaxial with the rotor 140 and nacelle 150 on central axis 105. The turbine and annular airfoils are supported by a tower structure 102 and rotate about a yaw axis 107. A fairing 130 is engaged with tower structure 102 above the yaw mechanism 118.

A fairing, engaged with the rotating portion of the tower, from the yaw mechanism upward, provides aerodynamic damping. In one embodiment the pivot axis of the fairing is coaxial with the pivot axis of the yaw mechanism. Mass-balancing is accomplished with a mass ahead of, or up-wind of, the yaw axis. The mass is engaged with a pivot arm or linkage that is in turn engaged with a movable flap.

Figure 4:
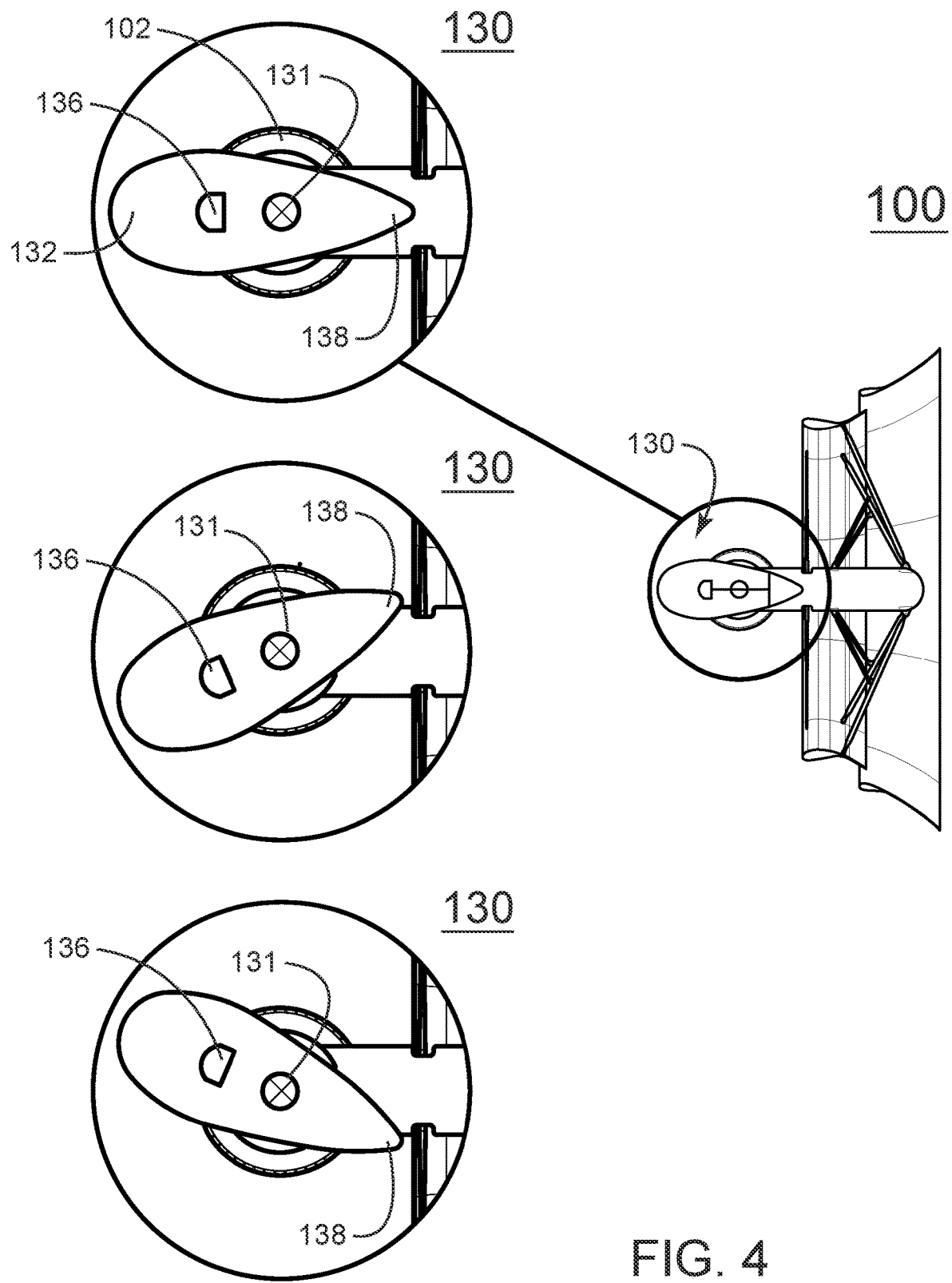
FIG. 4 is a top, cross-sectional, detail view of the fluid turbine of FIG. 1.

FIG. 4 shows a fairing 130. The fairing is a substantially symmetrical, vertical, aerodynamic form that counters the aero-elastic response of the structure to provide aerodynamic damping. The fairing 130 comprises a leading edge 132 and a trailing edge 138. The fairing's pivot axis 131 is coaxial with the yaw axis 107 (FIG. 2). In the present embodiment, the yaw axis is coaxial with the long axis of the tower 102. The fairing 130 is engaged with a mass 136. The mass 136 is ahead of (upwind of) the pivot axis 131. The weighted, pivoting fairing 130 provides mass-balancing as acceleration to the left deflects the fairing to increase the force to the right. Acceleration to the right causes the fairing 130 to deflect and increase force to the left. The passive action of the fairing counters the dynamic amplification factor of forces on the structure.

Figure 5:
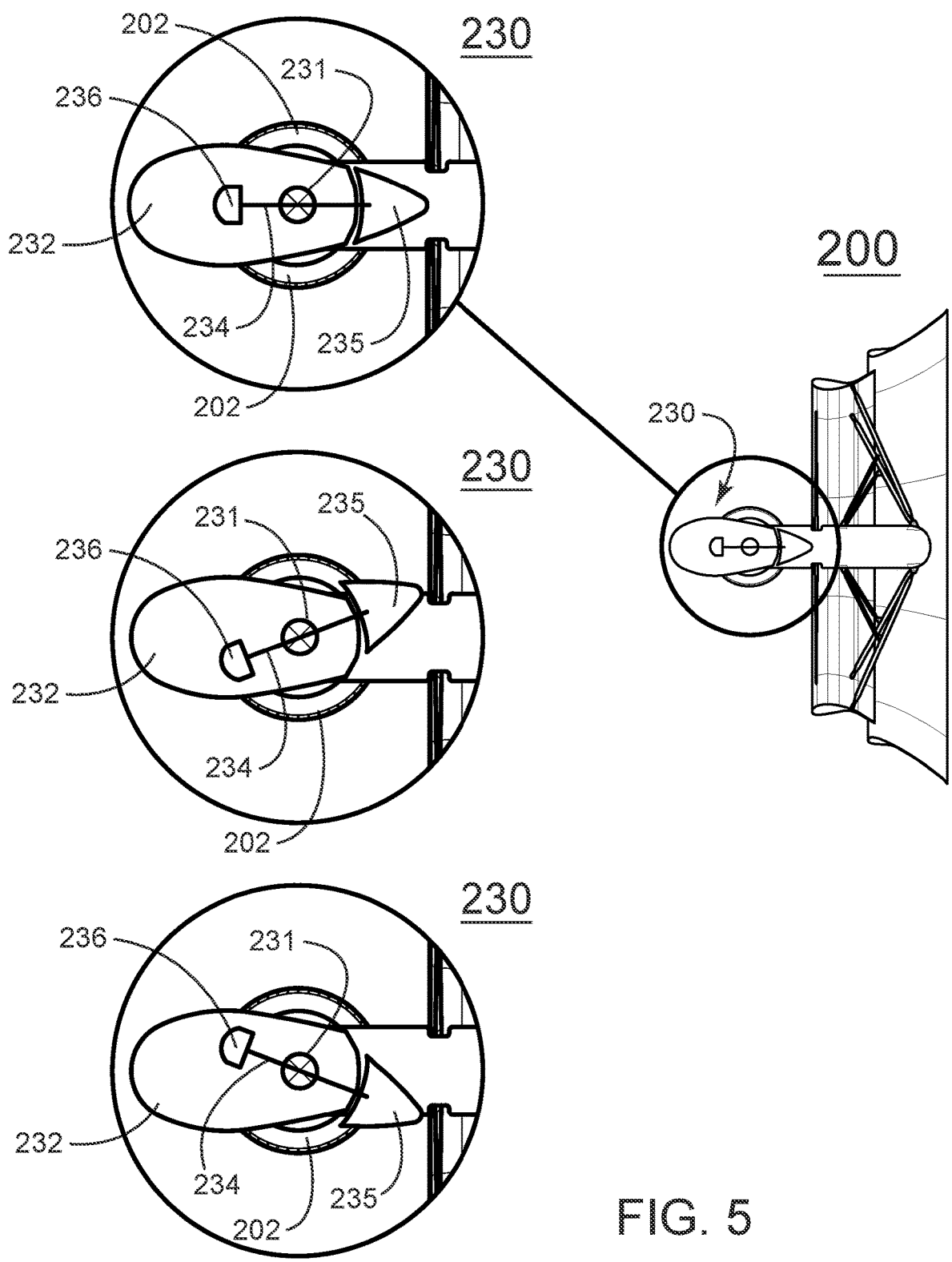
FIG. 5 is a top, cross-sectional, detail view of an iteration of the fluid turbine.

FIG. 5 shows a fairing 230 with a leading edge 232 and an apportioned flap 235 that makes up the trailing edge of the fairing. The leading edge 232 pivots with the turbine 200 about the yaw axis. The pivot axis 231 is coaxial with the yaw axis, which is coaxial with the long, vertical axis of the tower 202. The apportioned flap 235 is engaged with a pivot arm 234 that is further engaged with a mass 236. The pivot arm 234 rotates about the yaw axis 231. The mass 236 is ahead of (upwind of) the pivot axis 231. The weighted, pivoting, apportioned flap 235 provides mass-balancing as acceleration to the left deflects the flap to increase the force to the right. Acceleration to the right causes the flap 235 to deflect to increase force to the left.

One skilled in the art understands that the pivoting flap or pivoting fairing may also be driven to provide an aerodynamic yaw mechanism.

The invention claimed is:

1. A fluid turbine comprising:
a rotor rotationally engaged with a generator in a nacelle; and
a tower engaged with said nacelle and residing upwind of said rotor; and
a pivot axis coaxial with a long axis of said tower; and
a substantially vertical aerodynamic form in fluid communication with said rotor and configured to pivot about said pivot axis, having a leading edge and a trailing edge;
said leading edge upwind of said trailing edge and upwind of said pivot axis; and
said trailing edge downwind of said pivot axis and proximal to said rotor; and
an apportioned flap pivotally engaged with said pivot axis; wherein
acceleration in a first direction deflects said apportioned flap to increase force in a second direction, which opposes said first direction.

2. The fluid turbine of claim 1 further comprising:
said apportioned segmented flap is engaged with a pivot arm; and
said pivot arm is pivotally engaged about said pivot axis and is fixedly engaged with a mass that resides upwind of said pivot axis.

* * * * *